No. 815,148. PATENTED MAR. 13, 1906.
L. L. DAVIS.
LIFTING HOOK.
APPLICATION FILED SEPT. 19, 1905.

WITNESSES:
Chas. K. Davies
M. E. Moore

INVENTOR
Leonard L. Davis,
By Wm. N. Moore
Attorney

UNITED STATES PATENT OFFICE.

LEONARD L. DAVIS, OF NEWPORT NEWS, VIRGINIA, ASSIGNOR TO WALTER R. TEMPLE, OF NEWPORT NEWS, VIRGINIA.

LIFTING-HOOK.

No. 815,148.    Specification of Letters Patent.    Patented March 13, 1906.

Application filed September 19, 1905. Serial No. 279,071.

*To all whom it may concern:*

Be it known that I, LEONARD L. DAVIS, a citizen of the United States, residing at Newport News, in the county of Warwick and State of Virginia, have invented certain new and useful Improvements in Lifting-Hooks, of which the following is a specification.

My invention relates to improvements in lifting-hooks, and refers to a device of this character particularly adapted to the lifting and hoisting of heavy loads and wherever a rapid and easy manipulation is desired in fastening and unclasping the hook.

One object of my invention is the provision of a lifting-hook which can be quickly opened to secure the load and which is self-locking and will not trip when the load is applied.

Another object of my invention is the provision of a lifting-hook which will be symmetrically constructed, so that the stress will be equally distributed throughout the metal of the hook and which will present a smooth outer surface, so that there will be no projections or lugs to catch on an object and cause the load to become unbalanced.

With these and other objects in view my invention consists of a lifting-hook comprising a rigid member and a movable member, said rigid member being provided with the usual swivel-joint and the movable member connected to the rigid member by a slotted joint, so that the latter may be moved upward with respect to the former member in order to bring the hooked ends of the members out of engagement, and thereby open the hook.

My invention further consists in certain other novel features of construction and combination of parts, as herein set forth.

Figure 1:
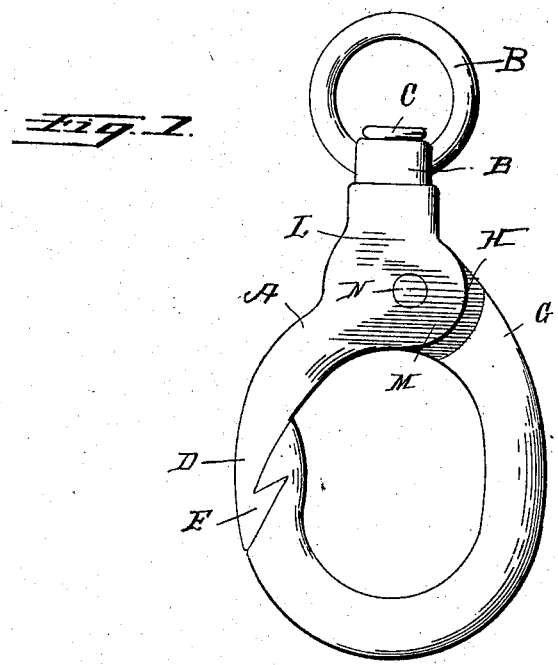
Figure 2:
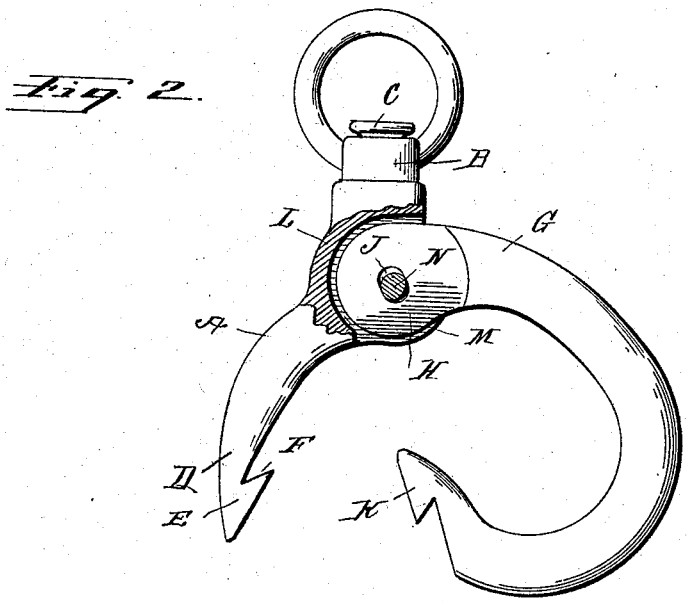

Figure 1 is a front elevation view of my improved hook with the members in the closed or locked position. Fig. 2 is a similar view with the parts in open position and a portion of the rigid member broken away to show the construction of the slotted joint between the members.

My hook consists of the rigid hook member A, provided at the top with the headed bolt C, which passes through a ring B of the swivel B', and this rigid member is formed with the downward-extending curved hook portion D, having the lug E formed on the end thereof. The lug E is so formed that its upper face F slants downward or toward the outside of the hook.

The loose or movable member G forms the larger part of the hook proper and is provided at its upper end with the flat extension or lug H, having the slot J therein. At its other or lower end the member G is provided with a complementary lug K, adapted to be engaged by the lug on the rigid member when the members are closed. The head L of the rigid member is formed with two projecting ears M, between which the extension H of the loose member fits, and the pin or journal N passes through the slot in the extension, and thereby secures the members together. The slot in the extension of the loose member lies in a perpendicular direction, or parallel to the center line of the hook when locked, so that when the load is applied to the hook the journal N is not called upon to take the stress until the clutch consisting of the lugs carried by the members has drawn tight, and this insures the hook against opening or tripping after the load is applied.

To disengage the hook or clutch after the load has been taken off, it is simply necessary to force the loose member upward until the lugs become disengaged, and the movable member may be then hinged upward and the cable or chain removed from the hook. The upward movement of the loose member is limited by the length of the slot, which may be of any desired size.

It will be noted that the hook is so designed that the line of pull comes centrally therethrough, thereby causing the stress to be equalized on each side of the hook.

From this description, taken in connection with the drawings, it will be evident that I provide a hook which is simple and durable in construction, which is absolutely safe and will not trip or open when the load is applied, which is very strong and efficient and practical in every particular.

I claim—

1. A hook, consisting of a rigid hook member having a head formed with a headed bolt, a ring or swivel secured to said bolt, a movable hook member having a flat slotted extension formed on its upper end, said rigid member formed with ears between which said extension fits, and a pin secured in the ears and passing through the slot in the extension.

2. A hook consisting of a rigid hook member having a head formed with a headed bolt, a ring or swivel secured to said bolt, a movable hook member having a flat slotted extension formed on its upper end, said rigid member formed with ears between which said extension fits, a pin secured in the ears and passing through the slot in the extension, and complementary engaging lugs formed on the ends of the hook members.

3. A hook consisting of a rigid hook member having a head formed with a recess therein, a swivel secured to the head, a movable hook member having a flat slotted extension formed on the upper end thereof and adapted to be secured in said recess.

In testimony whereof I affix my signature in presence of two witnesses.

LEONARD L. DAVIS.

Witnesses:
BARNEY H. SMITH,
J. WINSTON READ.